United States Patent
Kumar et al.

(10) Patent No.: US 7,204,409 B2
(45) Date of Patent: Apr. 17, 2007

(54) READER APPLICATION MARKUP LANGUAGE SCHEMA

(75) Inventors: Anush Kumar, Seattle, WA (US); Mohamed Fakrudeen Ali Ahmed, Coimbatore (IN); Janaki R. Goteti, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/025,702

(22) Filed: Dec. 29, 2004

(65) Prior Publication Data

US 2006/0043165 A1    Mar. 2, 2006

Related U.S. Application Data

(60) Provisional application No. 60/606,577, filed on Sep. 2, 2004, provisional application No. 60/606,281, filed on Sep. 1, 2004.

(51) Int. Cl.
*G06F 17/00* (2006.01)
*G06K 19/06* (2006.01)

(52) U.S. Cl. ...................... 235/375; 235/492

(58) Field of Classification Search ........... 235/375, 235/385, 492, 380, 432, 451; 700/214; 707/100, 707/104, 8, 200, 201; 709/220; 710/11; 340/10.1
See application file for complete search history.

(56) References Cited

U.S. PATENT DOCUMENTS

| 5,650,768 | A | 7/1997 | Eswaran |
| 6,631,363 | B1 | 10/2003 | Brown et al. |
| 6,677,852 | B1 | 1/2004 | Landt |
| 6,732,923 | B2 | 5/2004 | Otto |
| 6,784,802 | B1 | 8/2004 | Stanescu |
| 2002/0059471 | A1 | 5/2002 | Sanghvi et al. |
| 2002/0070865 | A1 | 6/2002 | Kenneth et al. |
| 2002/0143624 | A1* | 10/2002 | Catan ........................ 705/14 |
| 2002/0170952 | A1 | 11/2002 | Alsafadi et al. |
| 2003/0135576 | A1 | 7/2003 | Bodin |
| 2003/0144926 | A1 | 7/2003 | Bodin et al. |

(Continued)

FOREIGN PATENT DOCUMENTS

WO         03102845         12/2003

(Continued)

OTHER PUBLICATIONS

Floerkemeier et al., "PML Core Specification 1.0", Sep. 13, 2003, Auto-ID Center, Version 1.0, all.*

(Continued)

*Primary Examiner*—Michael G. Lee
*Assistant Examiner*—Thien T Mai
(74) *Attorney, Agent, or Firm*—Amin, Turocy, & Calvin, LLP

(57) ABSTRACT

The subject invention provides a system and/or method that facilitates executing a Radio Frequency Identification (RFID) process by employing a reader application markup language (RAML) schema that provides a portable format to setup and deploy such RFID process. A schema component can receive RFID data relating to an RFID architecture wherein a RAML schema can be created based at least upon such RFID data (e.g., discovered readers including settings and/or configurations). The RAML schema can include a sub-system definition (e.g., containing the definition of server state and entities in such server) and a process definition (e.g., containing process related entities and inter-relationships).

17 Claims, 10 Drawing Sheets

U.S. PATENT DOCUMENTS

| | | | |
|---|---|---|---|
| 2003/0155413 A1* | 8/2003 | Kovesdi et al. | 235/375 |
| 2003/0225928 A1 | 12/2003 | Paul | |
| 2003/0227392 A1 | 12/2003 | Ebert et al. | |
| 2004/0016796 A1* | 1/2004 | Hanna et al. | 235/375 |
| 2004/0046642 A1 | 3/2004 | Becker et al. | |
| 2004/0111335 A1 | 6/2004 | Black et al. | |
| 2004/0215667 A1* | 10/2004 | Taylor et al. | 707/201 |
| 2004/0217864 A1* | 11/2004 | Nowak et al. | 340/572.1 |
| 2004/0222298 A1* | 11/2004 | Dearing et al. | 235/385 |
| 2004/0238635 A1* | 12/2004 | Ozaki et al. | 235/451 |
| 2004/0245332 A1* | 12/2004 | Silverbrook et al. | 235/380 |
| 2004/0250066 A1* | 12/2004 | Di Luoffo et al. | 713/168 |
| 2005/0062603 A1 | 3/2005 | Fuerst et al. | |
| 2005/0092825 A1* | 5/2005 | Cox et al. | 235/375 |
| 2005/0108628 A1* | 5/2005 | Grambihler et al. | 715/513 |
| 2005/0150952 A1 | 7/2005 | Chung | |
| 2005/0150953 A1* | 7/2005 | Alleshouse | 235/432 |
| 2005/0237194 A1 | 10/2005 | VoBa | |

FOREIGN PATENT DOCUMENTS

| | | |
|---|---|---|
| WO | WO 03/102845 | 12/2003 |
| WO | WO 2005078633 | 8/2005 |

OTHER PUBLICATIONS

U.S. Appl. No. 11/141,619, filed May 31, 2005, Kumar et al.
U.S. Appl. No. 11/140,726, filed May 31, 2005, Agarwal et al.
U.S. Appl. No. 11/141,533, filed May 31, 2005, Kumar et al.
U.S. Appl. No. 11/069,459, filed Mar. 1, 2005, Kumar et al.
U.S. Appl. No. 11/061,356, filed Feb. 18, 2005, Kumar et al.
U.S. Appl. No. 11/061,337, filed Mar. 1, 2005, Kumar et al.
European Search Report dated May 11, 2006, mailed May 12, 2006 for European Patent Application Serial No. EP05107744, 9 pages.
European Search Report dated Mar. 9, 2006, mailed Mar. 27, 2006 for European Patent Application Serial No. EP05107744, 7 pages.
European Search Report dated Oct. 4, 2006 and mailed Apr. 11, 2006 for EP 05108005, 9 pages.
European Search Report dated Mar. 9, 2006 mailed Mar. 22, 2006 for European Patent Application Serial No. EP05107794, 7 pages.
ANONYMOUS: "The Sun Global RFID Betwork Vision: Connecting Businesses at the Edge of Network" Internet Article, Jul. 2004, http://www.sun.com/software/solutions/rfid/Sun_RFIS_Vision_rla.pdf.
U.S. Appl. No. 11/025,702, filed Feb. 18, 2005, Kumar et al.
U.S. Appl. No. 11/069,459, filed Feb. 18, 2005, Kumar et al.
U.S. Appl. No. 11/061,356, filed May 31, 2005, Kumar et al.
U.S. Appl. No. 11/140,726, filed May 31, 2005, Kumar et al.
U.S. Appl. No. 11/141,533, filed May 31, 2005, Agarwal et al.
European Search Report dated Oct. 2, 2006, mailed Feb. 10, 2006 for European Patent Application Seial No. 05107796, 6 pages.
Tsetsos, et al. "Commerical Wireless Sensor Networks: Technical and Business Issues" Proceedings of the Second Annual Conference on Wireless On-Demand Network Systems and Services (Jan. 19-21, 2005) 8 pages.
Branch, et al. "Sentire: A Framework for Building Middleware for Sensor and Actuator Networks" Proceedings of the Third International Conference on Pervasive Computing and Communications Workshops Mar. 8, 2005) pp. 396-400.
Harrison, et al. "Information Management in the Product Lifecycle-the Role Networked RFID" Proceedings of the Second IEE International Conference (Jun. 24, 2004) pp. 507-512.
Bornhovd, et al. "Integrating Smart Items with Business Processes An Experience Report" Proceedings of the Thirt-Eight Hawaii International Conference on System Science (Jan. 3, 2005) 8 pages.
Ganesh, et al. "Web Services and Multi-Channel Integration: A Proposed Framework" Proceedings of the IEEE International Conference on Web Services (Jul. 6, 2004) 8 pages.
European Search Report dated Feb. 6, 2006, mailed Feb. 6, 2006 for European Patent Application Seial No. 05107826, 7 pages.
Ortiz. "An Introduction to Java Card Technology—Part 1" http://developers.sun.com/techtopics/mobility/javacard/articles/javacard1/> last viewed Dec. 19, 2005, 14 pages.
Chen. "Understanding Java Card 2.0" URL:.com//javaworld/jw-03-1998/jw-03-javadev_p.html> last viewed Dec. 19, 2005, 12 pages.
IBM "alphaWorks: RFID Device Development Kit: Overview" http://www/alphaworks.ibm.com/tech/rfiddevice last viewed Nov. 7, 2005, 1 page.
Alien "ALR-9800 Enterprise RFID Reader" http://www.alientechnology.com/docs/AT_DS_9800_v3_WEB.pdf last viewed Nov. 17, 2005, 4 pages.
European Search Report dated Feb. 7, 2006; mailed Feb. 7, 2006 for PCT Application Serial No. EP 05 10 8001; 7 pages.
Floerkemier, et al. "PML Core Specification 1.0" Sep. 13, 2003, Auto-ID Center, Version 1.0, 48 pages.

* cited by examiner

READER APPLICATION MARKUP LANGUAGE SCHEMA

CROSS-REFERENCE TO RELATED APPLICATION(S)

This application claims the benefit of U.S. Provisional Patent Application Ser. No. 60/606,281 filed on Sep. 1, 2004, entitled "SYSTEM AND METHODS THAT FACILITATE RFID SERVER PROGRAMMING MODEL AND API'S," and U.S. Provisional Patent Application Ser. No. 60/606,577 filed on Sep. 2, 2004, entitled "FACILITATE RFID SERVER PROGRAMMING MODEL AND API'S." This application is also related to co-pending U.S. patent application Ser. Nos. 11/069,459, 11/061,356, and 11/061,337, filed on Mar. 1, 2005, Feb. 18, 2005 and Feb. 18, 2005, respectively. The entireties of these applications are incorporated herein by reference.

TECHNICAL FIELD

The subject invention generally relates to Radio Frequency Identification (RFID), and more particularly to a language schema to facilitate executing an RFID process associated with an RFID system and/or method.

BACKGROUND OF THE INVENTION

Many retail, manufacture, and distribution establishments are applying different and innovative operating methods to increase efficiency. These establishments monitor store inventory in order to optimize supply and demand relating to consumers. One aspect of maximizing profit hinges on properly stocking inventory such that replenishment occurs in conjunction with exhaustion of goods and/or products. For example, a retailer selling a computer and a VCR, must stock the computer in relation to its consumer sales, and stock the VCR in relation to its consumer sales. Thus, if the computer is in higher demand (e.g., more units sold) than the VCR, the retailer can stock the computer more frequently in order to optimize supply and demand, and in turn, profit. Monitoring an inventory and associated sales is a complex task, wherein product activity is comparable to a black box since inner workings are unknown; yet monitoring products is a crucial element in inventory/product efficiency.

One type of monitoring system and/or method relating to products is a portable image collection device (e.g., barcode reader), which is widely used in manufacturing, service and package delivery industries. Such devices can perform a variety of on-site data collection activities. Portable data collection devices often include integrated bar code dataform readers adapted to read bar code dataforms affixed to products, product packaging and/or containers in warehouses, retail stores, shipping terminals, for inventory control, tracking, production control and expediting, quality assurance and other purposes.

A unique bar code can be placed on a product, wherein the bar code can be associated with information relating to the product. For example, a bar-code scanner can be utilized to scan a barcode on a product, and information can be retrieved based upon the scanning. Such identifying information, however, is aesthetically displeasing as such information can clutter the product. Moreover, tears, smudges, annotation or other physical damage/alteration to a barcode can render such conventional systems and or methodologies substantially useless. If a portion of a bar code is torn from the product, a bar code scanner may not be able to correctly read the bar code. Similarly, a smudge on a product can render such barcode unreadable.

Furthermore, monitoring systems and/or methods utilizing barcode readers and a universal product code (UPC) confront a user (e.g., retailer, distributor, manufacturer, . . . ) with additional complications. Barcode readers require a line of sight in order to properly monitor products. For example, a typical barcode system requires a scanner to be within 4–8 inches of a barcode and/or UPC to achieve a proper read. Not only does a barcode system require line of sight, manual scans are necessary on each individual product in order to identify the product. Moreover, a single barcode and/or UPC must represent all instances of a product (e.g., a bottle of ketchup of brand Tomato is designated a single UPC and/or barcode for representation of the product). In addition, the amount of information associated to the single barcode and/or UPC is limited. Thus, a scanning of brand Tomato ketchup can give the product identification and a price. Not only is the information insubstantial, but the information is not conducive to real-time product monitoring.

Automatic identification and data capture (AIDC) technology, specifically, Radio Frequency Identification (RFID) has been developed based at least upon the need to cure the above deficiencies of monitoring systems and/or methodologies (e.g., barcode readers, barcodes, and/or UPCs). RFID is a method of remotely storing and retrieving data utilizing RFID tags. Since RFID systems are based upon radio frequency and associated signals, numerous benefits and/or advantages precede traditional techniques in monitoring products. RFID technology does not require a line of sight in order to monitor products and/or receive signals from RFID tags. Thus, no manual scan is necessary wherein the scanner is required to be in close proximity of the target (e.g., product). Yet, range is limited in RFID based upon radio frequency, RFID tag size, and associated power source. Additionally, RFID systems allow multiple reads within seconds providing quick scans and identification. In other words, an RFID system allows a plurality of tags to be read and/or identified when the tags are within a range of an RFID reader. The capability of multiple reads in an RFID system is complimented with the ability of providing informational tags that contain a unique identification code to each individual product. Therefore, in contrast to a barcode system, each bottle of ketchup made by brand Tomato would have an associated identification code. For example, two bottles of ketchup made by brand Tomato have two distinct identification codes associated thereto within an RFID system; whereas in barcode systems, the two bottles of ketchup made by brand Tomato would have the same barcode and/or UPC. In another example, RFID systems and/or methods can be implemented in water such as tracking and/or monitoring underwater pipe, whereas a barcode monitoring system presents numerous complications under such conditions.

Moreover, RFID systems and/or methodologies provide real-time data associated to a tagged item. Real-time data streams allow a retailer, distributor, and/or manufacturer the ability to monitor inventory and/or products with precision optimizing supply and demand. Utilizing RFID can further facilitate supplying products on a front-end distribution (e.g., retailer to consumer) and a back-end distribution (e.g., distributor/manufacturer to retailer). Distributors and/or manufacturers can monitor shipments of goods, quality, amount, shipping time, etc. In addition, retailers can track the amount of inventory received, location of such inventory, quality, shelf life, etc. The described benefits demonstrate the flexibility of RFID technology to function across multiple domains such as, front-end supply, back-end supply, distribution chains, manufacturing, retail, automation, etc.

An RFID system consists of at least an RFID tag and a RFID transceiver. The RFID tag can contain an antenna providing the reception and transmission to radio frequency queries from the RFID transceiver. The RFID tag can be a small object, such as, for example, an adhesive sticker, flexible paper-thin labels, etc. There are typically four different frequencies the RFID tags utilize: low frequency tags (between 125 to 134 kilohertz), high frequency tags (13.56 megahertz), UHF tags (868 to 956 megahertz) and Microwave tags (2.45 gigahertz).

Within the various frequency ranges, RFID tags can be either passive or active. A passive RFID tag does not contain a power supply, yet the minute electrical current induced in the antenna by the received radio frequency from an RFID transceiver provides sufficient power for the tag to respond. Based at least upon the lack of power source, the passive RFID tag response is brief, consisting of an ID number (e.g., Globally Unique Identifier (GUID)). A GUID is a pseudo-random number that is unique and can be implemented by a standard Universally Unique Identifier (UUID) that is a 16-byte number written in hexadecimal format. However, RFID systems and/or methods have converged on storing information in, for instance, 64 bit or 96 bit format called a electronic product code (EPC). The lack of power supply in the passive RFID tag allows the device to be small and cost-efficient. Some passive RFID tags are measured to be 0.4 mm×0.4 mm, with a thickness thinner than a sheet of paper. Yet, the absence of the power supply limits the practical read range of the passive RFID tag from 10 mm to about 5 meters.

An active RFID tag contains a power source allowing longer read ranges. Active RFID tags are about the size of a U.S. currency coin, providing practical read ranges of about tens of meters while containing a battery life of up to several years. Furthermore, active RFID tags can be read and written. For instance, RFID tags can provide an additional security layer to deter theft by writing to an active RFID tag. A security bit can determine a security status based at least upon a RFID transceiver. In one security system, for example, an active RFID tag can have a security bit set/written to 1 indicating the product is not cleared to leave a secure area without triggering an alarm/warning. Once the appropriate conditions exist, the RFID system and/or method can write the bit on the tag to a 0, indicating the tagged product is cleared to leave the secure area.

An RFID system can consist of multiple components: tags, tag readers (e.g., tag transceivers), tag-programming stations, circulation readers, sorting equipment, tag inventory wands, etc. Moreover, various makes, models, types, and applications can be associated to each component (e.g., tag, tag readers, tag programming stations, circulation readers, sorting equipment, tag inventory wands, . . . ) complicating the discovery, configuration, setup, communication, maintenance, security, and/or compatibility within the RFID system and with other RFID systems. In view of the above, there is a need to provide a uniform way to discover, configure, setup, and communicate to RFID devices in respect to the maker and associated specifications.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate executing an RFID process within RFID architecture by employing a reader application markup language (RAML) schema that provides a portable format to setup and/or deploy such RFID process. A schema component can receive RFID data relating to an RFID deployment and creates the RAML schema. The RFID data (e.g., process related data) can be, but not limited to, discovered and/or configured RFID readers within the RFID architecture. Furthermore, RFID data is process related data. Once received, the schema component creates the RAML schema based at least upon RFID data (e.g., process related data) providing a portable format facilitating execution of an RFID process. The RAML schema specifies a logical reader collection, an event policy for a filter and/or alert, an event handler, a write handler, and/or tracking information that comprise an RFID process.

In accordance with one aspect of the subject invention, the schema component further includes a generator component that creates the RAML schema based at least upon received RFID data. The RAML schema can be created such that it further contains a sub-system definition (e.g., set of all discovered and configured readers in a server) and a process definition. The sub-system definition contains the definition for entities in the server, which are independent of a process. Furthermore, the sub-system definition defines the server state and the entities on which processes are built. The process definition, on the other hand, contains the process related entities and inter-relationships. By creating the RAML schema to contain the sub-system definition and/or the process definition, the execution of an RFID process is facilitated by providing a portable format for setup and deployment of such defined RFID process.

In accordance with another aspect of the invention, the RAML schema can be stored in a memory and/or data store in order to facilitate executing an RFID process by providing a portable format that is versatile in form and availability. The schema component can create the RAML schema and store the RAML schema in a data store and/or memory such that the RAML schema can be utilized dynamically or later in time. The memory and/or data store utilized for the RAML schema can be a volatile and/or nonvolatile memory.

In accordance with yet another aspect of the subject invention, a setup component can be included in order to provide the schema component with a subset of the RFID data (e.g., process related data) by analyzing the RFID data received from an RFID architecture and/or RFID deployment. The RFID architecture can include a plurality of RFID reader collections, wherein the reader collection further includes at least one RFID reader capable of reading RFID tags. The setup component can analyze the RFID architecture to discover RFID reader(s) and associated data such as, but not limited to, configuration, specific settings, authorization, etc. The setup component determines the RFID readers and associated data within an RFID architecture allowing the schema component to create the RAML schema to facilitate executing an RFID process, wherein the RAML schema includes, for instance, a sub-system definition (e.g., RFID network definition) and/or a process definition. The RAML schema specifies a logical reader collection, an event policy for a filter and/or alert, an event handler, a write handler, and/or tracking information that comprise an RFID process.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other advantages and novel features of the invention will become apparent from the following detailed description of the invention when considered in conjunction with the drawings.

DESCRIPTION OF THE INVENTION

Figure 1:
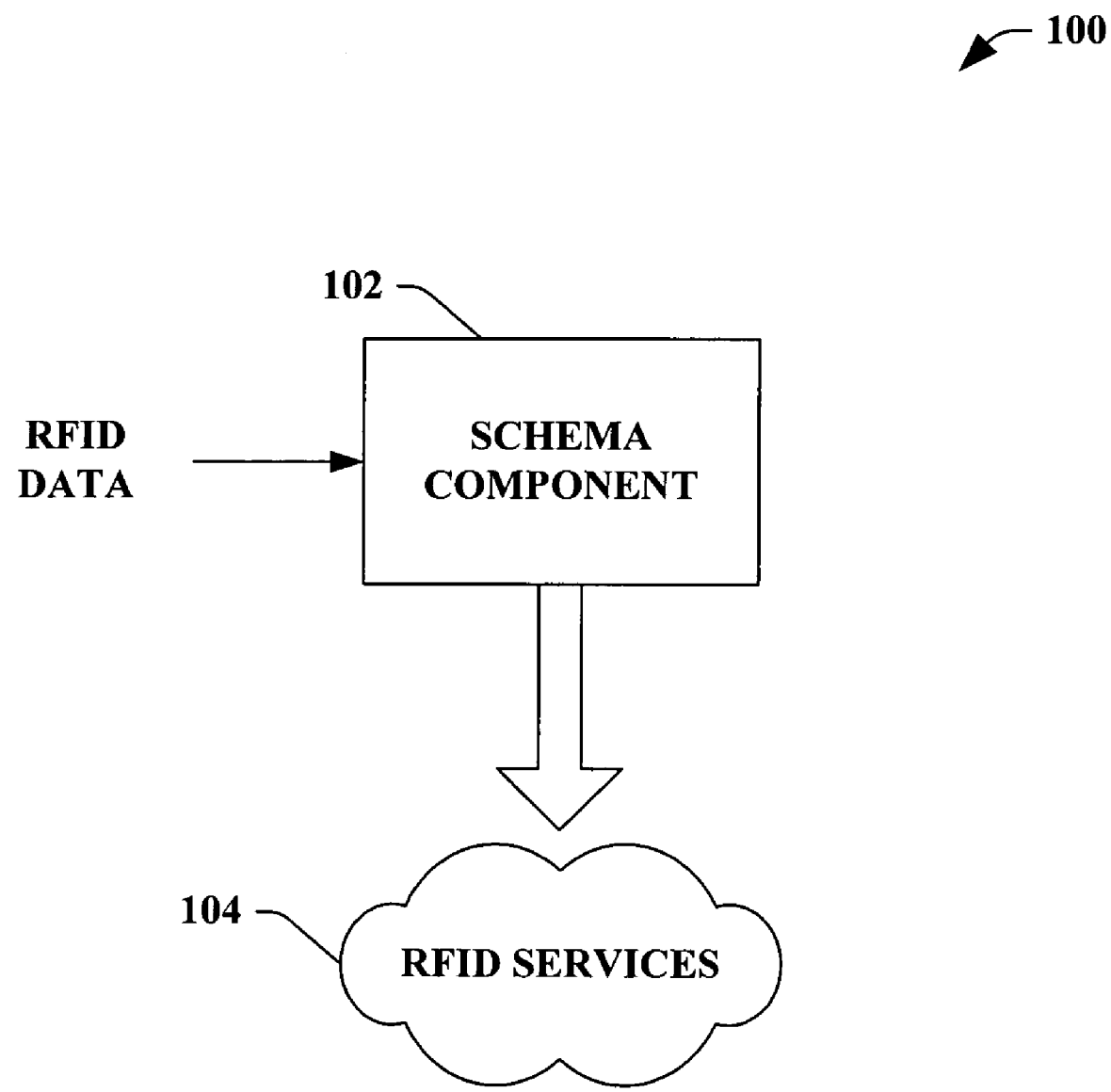
FIG. 1 illustrates a block diagram of an exemplary system that facilitates executing an RFID process by creating and/or employing a schema.

As utilized in this application, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

FIG. 1 illustrates a system 100 that utilizes a schema to facilitate executing at least one Radio Frequency Identification (RFID) process in an RFID architecture. RFID data, which is process related data that is associated to an RFID architecture, can be received by a schema component 102 wherein a reader application markup language (RAML) schema is employed to contain the definition of all entities in a server and the definition of all the process related to the entities and inter-relationships. The schema component 102 generates the RAML schema such that the server state and entities on which processes are built are defined and the associated RFID processes are defined. Moreover, the schema component 102 utilizes the RAML schema to represent the state of the server and the processes developed to be used by runtime. Once RFID data has been obtained by the schema component 102, a schema, for instance RAML, can be implemented that is utilized to provide RFID services 104 to an RFID architecture providing a portable format (e.g., RAML schema) for processes/services. It is to be appreciated the RAML schema is an extensible markup language (XML) schema that represents a single RFID processes (e.g., declarative process definition in XML). Furthermore, the RAML schema specifies a logical reader collection, an event policy for a filter and/or alert, an event handler, a write handler, and/or tracking information that comprise an RFID process.

In accordance with one aspect of the subject invention, the RFID data received by the schema component 102 allows the generation of RAML schema containing a sub-system definition (e.g., RFID network definition) and a process definition. The RFID data can contain a collection of at least one sub-system reader group consisting of at least one logical reader group, wherein the logical reader group has at least one reader to be utilized in a RFID service 104. In one example, the at least one logical reader group can contain a plurality of RFID readers in a sub-system reader group, wherein each tag reader has an associated reference (e.g., name, address, . . . ), reader settings (e.g., settings for a physical reader), transport settings (e.g., TCPIP, serial, HTTP, wireless, . . . ), properties (e.g., properties that can be applied to a reader and an associated property reference), and processes (e.g., encapsulating necessary information allowing a business logic to run and an associated process reference). It is to be noted and appreciated the association relating to each tag reader can occur at binding or deployment, yet such association can be encapsulated in the RAML schema. Moreover, it is to be appreciated that a reference can be related to differentiate/distinguish one sub-system reader collection (e.g., RFID network collection of readers) from another (e.g., readercollection1, readercollection2, . . . . Note that a first reader collection and a second reader collection can contain the same physical reader, wherein the bindings for each differ (e.g., a logical reader collection is specified in the RAML and bound to one or more physical readers at runtime).

For example, a warehouse containing five dock doors can have RFID readers associated to each. The sub-system reader collection (e.g., universe reader collection, RFID network collection of readers, . . . ) for the entire warehouse can be referenced with, for instance, warehouse_readercollection1, wherein the RFID readers at each dock door can be grouped into a reader collection, yielding five reader collections (e.g., readerdockdoor1, readerdockdoor2, . . . ). Each reader at a dock door can have, for instance, a reference (e.g., reader1dockdoor1, reader2dockdoor1, . . . ), reader settings (RFID range set to 0.5 meters), transport settings (e.g., TCPIP), properties (e.g., time out property with reference property1_reader1dockdoor1), and processes (e.g., created by the portable format schema such as RAML).

Furthermore, the RFID data obtained by the schema component 102 employs a reader application markup language (RAML) schema that consists of a process definition containing all process related entities and inter-relationships within the sub-system definition (e.g., RFID network definition, device configuration definition, definition of the set of all discovered and configured readers in a server, . . . ) such as, for instance, logical source(s), (e.g., collection of at least one of logical source, reader collection, and/or event handler), tracker log(s) (e.g., tracking the activity of at least one RFID reader), parameters collection(s), security (e.g., RFID readers authorized to create, modify and/or execute), filter(s), alert(s), event handler(s), and data sink(s) (e.g., collection of data). Thus, following the above, the sub-system reader collection (e.g., universe reader collection, RFID network collection of readers) for the entire warehouse has process related entities and inter-relationships which can be received by the schema component 102 allowing the employment of a RAML schema that provides a portable format for the RFID services/processes applied to the RFID architecture.

In one example, the schema component 102 can obtain RFID data to create and utilize a schema to implement an RFID service 104, wherein the RFID service 104 is a "Shipping Process" that represents multiple readers at various dock doors working together to perform tag reads, filtering tag reads, enriching tag reads, evaluating alerts, and storing relevant data to a sink for a host application. A dock door can contain a plurality of tag readers wherein multiple reads of a source tag can be provided. Such multiple reads can be read and filtered wherein, for instance, multiple reads of the same ID are filtered out (e.g., dropped). Moreover, alerts can be associated to such tag reads such as, for instance, alerting the arrival or departure of a source tag. Such RFID data can be utilized by the schema component 102 in order to generate a schema allowing a portable format for the RFID processes in the RFID architecture.

In yet another example, the schema component 102 can receive RFID data to create and utilize a schema to implement an RFID service 104 such as a "Manufacturing Process" where readers are configured to read as well a write based at least upon a particular location of a good. It is to be appreciated the "Manufacturing Process" can perform functions similar to those of a "Shipping Process" such as, but not limited to, filtering, enrichment, alerting, storing, etc. at the respective locations, wherein such RFID data facilitates creating the schema created by the schema component 102 which provides a portable format for the RFID processes in the RFID architecture.

Figure 2:
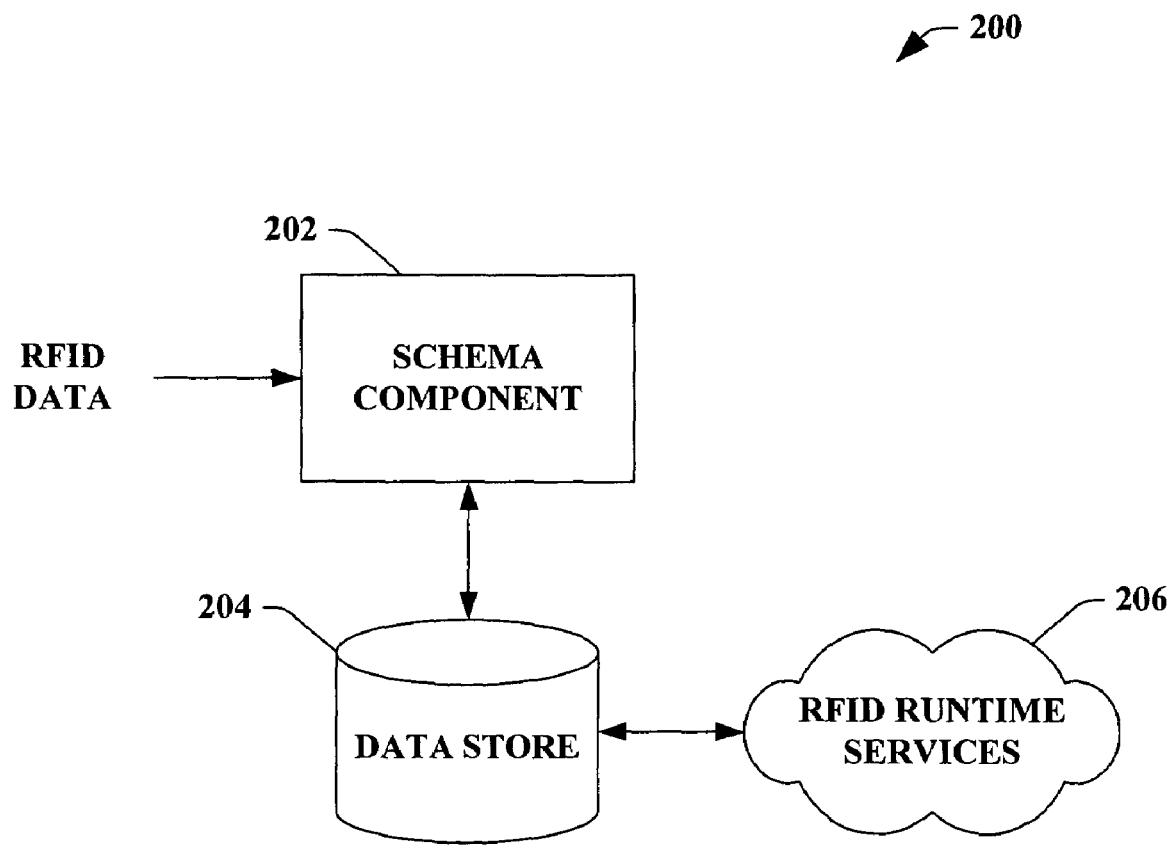
FIG. 2 illustrates a block diagram of an exemplary system that facilitates executing an RFID process by creating and/or employing a schema and storing the schema in a data store.

FIG. 2 illustrates a system 200 that creates and/or employs a schema to facilitate executing an RFID process within an RFID architecture by providing a portable format for such process. A schema component 202 can receive an RFID data from which a schema (e.g., reader application markup language (RAML) schema) can be utilized in order to represent the state of a server and the processes being developed and used by an RFID runtime to execute the RFID processes. The RFID data obtained can be either sub-system related data (e.g., RFID network, universe) and/or process related data. In order for the schema component 202 to create and/or employ a schema, the RFID data received provides RFID server (e.g., RFID architecture) entity data. For example, the RFID data can be the definition of the server state wherein such definition provides RFID readers, various collections of RFID readers, RFID reader associated data, etc. The received RFID data associated to the RFID architecture allows the schema component 202 to create and/or employ a reader application markup language (RAML) schema that facilitates executing an RFID process within such a defined server state containing at least one entity. In other words, the RAML schema provides a portable format for processes that can be utilized for RFID runtime services 206 that are applied to an RFID architecture. It is to be appreciated the RAML schema can be, for example, an XML (extensible Markup Language) schema that represents the RFID processes. Moreover, any suitable tagged or marked up language can represent the RAML schema.

It is to be appreciated the RAML schema can represent the state of the server (e.g., device definitions, sub-system definition, RFID network definition) and the processes being developed and utilized by the RFID runtime to execute the RFID processes (e.g., process definition). An object model (OM) and/or application program interface (API) abstracts a developer from having to create these instances (e.g., instances created and/or employed by utilizing the RAML schema). Yet, the context of the RFID network and/or RFID sub-system that is available (e.g., entities within the RFID architecture authorized to participate in RFID services) is provided by the RFID data in order to build an RFID process. The RFID process definition, in other words, utilizes a particular RFID network instance (e.g., RFID sub-system, universe instance) in order to design a process, wherein the RAML schema provides a portable format for these processes in the RFID network instance(s).

For example, the RFID data can be received by the schema component 202, wherein the RFID data provides at least RFID sub-system data (e.g., server state, device data, RFID network data). The RFID data can include, but not limited to, the readers in the server, a logical grouping or collection of readers within the server (e.g., Acme Warehouse RFID readers), references to the individual readers (e.g., names and/or references to specify/distinguish readers, for instance, Acme_Warehouse_reader1_dockdoor1), associated settings/configurations/specifications for each reader within the established RFID network (e.g., RFID sub-system, server), . . . .

After receiving the RFID data, the schema component 202 can employ a RAML schema to facilitate transporting of the format that contains the RFID processes relating to a particular RFID sub-system (e.g., RFID server, RFID network). In accordance with one aspect of the subject invention, the RAML schema can be stored/saved in a data store 204 in order to be utilized by RFID runtime services 206. The data store 204 provides a storage and/or retrieval for RAML schema, which allows a developer to setup and deploy an RFID process for a particular RFID deployment (e.g., RFID server) either dynamically or later in time.

The data store 204 can be employed to retain the RAML schema generated by the schema component 202 based at least upon the RFID data providing a portable format for an RFID process that facilitates implementing such process to an RFID architecture. Furthermore, the data store 204 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 204 of the subject systems and methods is intended to comprise, without being limited to, these and any other suitable types of memory.

An RFID runtime service 206 can be implemented on an RFID architecture, wherein the RFID runtime service can be, for example, an RFID process. It is to be appreciated the RFID process is the uber or high-level object that forms together various entities to create a meaningful unit of execution. Moreover, the schema component 202 provides a RAML schema such that the RFID process is in a portable/transmittable format to be implemented in an RFID architecture. For instance, the RFID process can be an outbound process (e.g., pick, pack, shipping scenario), a manufacturing process, a shipping process, a receiving process, tracking, data representation/manipulation/applicable, security, etc.

Figure 3:
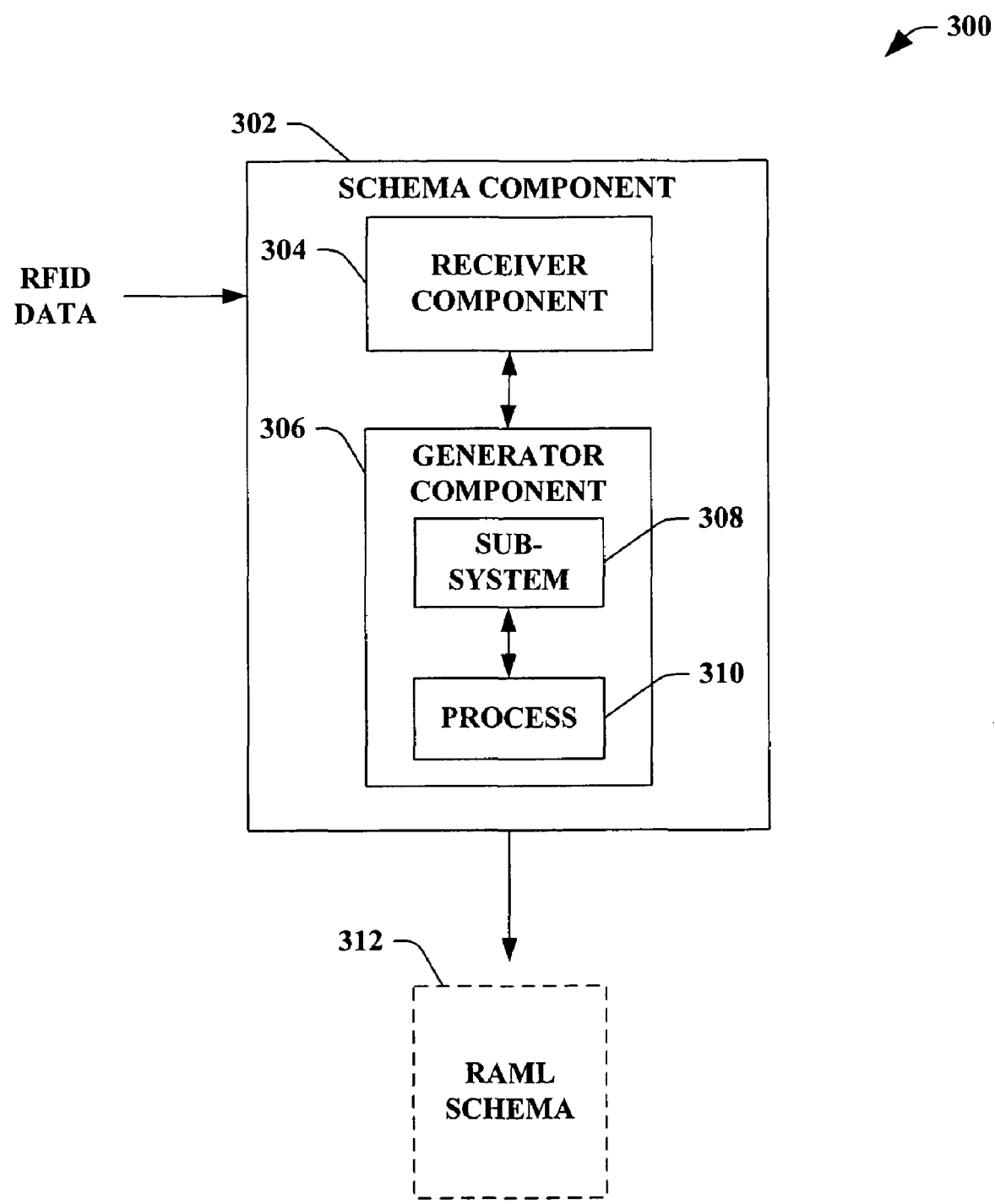
FIG. 3 illustrates a block diagram of an exemplary system that facilitates executing an RFID process by creating and/or employing a schema containing a sub-system definition (e.g., RFID network definition) and a process definition.

FIG. 3 illustrates a system 300 that facilitates implementing an RFID process by creating and/or employing a reader application markup language (RAML) schema that provides a portable format to implement an RFID process. A schema component 302 employs a reader application markup language (RAML) schema 312 based at least upon a RFID data. Moreover, the schema component 302 further includes a receiver component 304 that obtains the RFID data allowing the schema component 302 to create the RAML schema 312 which facilitates executing an RFID process within an RFID architecture.

The schema component 302 further includes a generator component 306 that generates the RAML schema 312. The generator component 306 generates the RAML schema 312 wherein the RAML schema 312 can contain a sub-system definition 308 and/or a process definition 310. It is to be appreciated the sub-system definition 308 is the definition of a server state on which a process will run. In other words, the sub-system definition 308 contains the definition for all the entities in a server, which are independent of any process (e.g., defining the server state and the entities on which processes are built). Additionally, one is to appreciate the process definition 310 defines an RFID process such that a particular sub-system instance is utilized to design such a process. Thus, the process definition 310 contains all the process related entities and inter-relationships (e.g., the RFID process specifies a process built on top of a sub-system). It is also to be appreciated the RAML schema is a portable data format containing at least one RFID process, wherein the RAML schema can contain a sub-system definition 308 and/or a process definition 310.

The generator component 306 generates the RAML schema 312 containing the sub-system definition 308. It is to be appreciated for code simplicity, "server" will be used for the sub-system definition 308. For example, the RAML schema 312 containing the sub-system definition 308 can be identified with "DeviceConfiguration," with a target namespace location and associated reference "DeviceConfiguration.xsd." Moreover, XML version and associated encoding is defined. The above is depicted with the following code:

```
<?xml version="1.0" encoding="utf-8"?>
<xs:schema id="DeviceConfiguration" elementFormDefault="qualified"
xmlns:xs="http://www.w3.org/2001/XMLSchema"
targetNamespace="http://tempuri.org/DeviceConfiguration.xsd"
xmlns="http://tempuri.org/DeviceConfiguration.xsd">
```

The target namespace, referred to as "targetNamespace," can be an issued URI, thus the subject invention is not so limited as to such namespace.

The sub-system definition 308 defines an element "device" of the type "Device". The complex type "Device" contains a sequence of element names and types as shown by the following code:

```
<xs:complexType name="Device">
  <xs:sequence><xs:element minOccurs="0" maxOccurs="1"
  name="deviceInformation" type="DeviceInformation" />
  <xs:element minOccurs="0" maxOccurs="1" name="name"
  type="xs:string" />
  <xs:element minOccurs="0" maxOccurs="1" name="settings"
  type="DeviceSettings" />
  </xs:sequence> </xs:complexType>
```

The above code illustrates the initial instantiation of a complex type named "DeviceReader," wherein the elements "DeviceInformation" "name" and "PropertyProfile" are members. Once the members are defined as elements of "Device," the members (e.g., "DeviceInformation" "name" and "PropertyProfile" . . . ) can further be defined. The sub-system definition 308 can define "DeviceInformation" with the following code:

```
<xs:complexType name="DeviceInformation">
<xs:sequence>
   <xs:element minOccurs="0" maxOccurs="1" name="deviceId"
type="xs:string" />
   <xs:element minOccurs="0" maxOccurs="1" name="providerId"
type="xs:string" />
   <xs:element minOccurs="1" maxOccurs="1" name="Transport"
type="Transport" />
   <xs:element minOccurs="0" maxOccurs="1" name="transportSettings"
type="TransportSettings" /> <xs:element minOccurs="0" maxOccurs="1"
name="providerData" />
</xs:sequence>
</xs:complexType>
      <xs:complexType name="TransportSettings" abstract="true" />
      <xs:complexType name="SerialTransportSettings">
      <xs:complexContent mixed="false">
      <xs:extension base="TransportSettings">
      <xs:sequence>
      <xs:element minOccurs="0" maxOccurs="1" name="port"
   type="xs:string" />
      <xs:element minOccurs="1" maxOccurs="1" name="baudRate"
   type="xs:int" />
      </xs:sequence>
      </xs:extension>
      </xs:complexContent>
      </xs:complexType>
      <xs:complexType name="TcpTransportSettings">
      <xs:complexContent mixed="false">
      <xs:extension base="TransportSettings">
      <xs:sequence>
      <xs:element minOccurs="0" maxOccurs="1" name="host"
type="xs:string" />
      <xs:element minOccurs="0" maxOccurs="1" name="port"
type="xs:string" />
      </xs:sequence>
```

```
    </xs:extension>
  </xs:complexContent>
</xs:complexType>
```

Furthermore, "PropertyProfile" is defined, wherein the settings for a physical reader are determined. It is to be appreciated "PropertyProfile" is independent of a process. Moreover, "PropertyProfile" contains the configuration (e.g., list of properties for the reader). The above is illustrated by the following code:

```
<xs:complexType name="PropertyProfile">
  <xs:sequence>
    <xs:element minOccurs="0" maxOccurs="1" name="Name" type="xs.string" />
    <xs:element minOccurs="0" maxOccurs="1" name="Properties" type="ArrayOfProperty" />
  </xs:sequence>
</xs:complexType>
<xs:complexType name="ArrayOfProperty">
  <xs:sequence>
    <xs:element minOccurs="0" maxOccurs="unbounded" name="Property" nillable="true" type="Property" />
  </xs:sequence>
</xs:complexType>
<xs:complexType name="Property">
  <xs:sequence>
    <xs:element minOccurs="0" maxOccurs="1" name="name" type="xs:string" />
    <xs:element minOccurs="0" maxOccurs="1" name="value" type="xs:anyType" />
  </xs:sequence>
</xs:complexType>
```

Once defined in "DeviceConfiguration.xsd," "Transport" is further defined with the following code:

```
<xsd:element name="transport" type="Transport" />
<xsd:simpleType name="Transport">
  <xsd:restriction base="xsd:string">
    <xsd:enumeration value="TCPIP" />
    <xsd:enumeration value="SERIAL" />
    <xsd:enumeration value="HTTP" />
    <xsd:enumeration value="WIRELESS" />
  </xsd:restriction>
</xsd:simpleType>
```

The "ArrayOfProperty" is a set of properties that can be applied to a reader. It contains a list of properties. The above can be illustrated by the code below:

```
<xs:complexType name="ArrayOfProperty">
  <xs:sequence>
    <xs:element minOccurs="0" maxOccurs="unbounded" name="property" nillable="true" type="Property" />
  </xs:sequence>
</xs:complexType>
<xsd:complexType name="Property">
  <xsd:sequence>
    <xsd:element name="name" type="xsd:string" />
    <xsd:element name="value" type="xsd:anyType" minOccurs="0" />
  </xsd:sequence>
</xsd:complexType>
```

Furthermore, the sub-system definition 308 can define "SerialTransportSettings", which defines "TransportSettings" if Serial communication is used. It is defined by the following code:

```
<xs:complexType name="SerialTransportSettings">
  <xs:complexContent mixed="false">
    <xs:extension base="TransportSettings">
      <xs:sequence>
        <xs:element minOccurs="0" maxOccurs="1" name="port" type="xs:string" />
        <xs:element minOccurs="1" maxOccurs="1" name="baudRate" type="xs:int" />
      </xs:sequence>
    </xs:extension>
  </xs:complexContent>
</xs:complexType>
```

Similarly "TcpTransportSettings" can be defined to handle "TransportSettings" for TCP communication. It is defined by the following code:

```
<xs:complexType name="TcpTransportSettings">
  <xs:complexContent mixed="false">
    <xs:extension base="TransportSettings">
      <xs:sequence>
        <xs:element minOccurs="0" maxOccurs="1" name="host" type="xs:string" />
        <xs:element minOccurs="0" maxOccurs="1" name="port" type="xs:string" />
      </xs:sequence>
    </xs:extension>
  </xs:complexContent>
</xs:complexType>
```

The sub-system definition 308 is generated by the generator component 306, which is included in the RAML schema 312 that is utilized to facilitate providing a portable format for RFID processes. The generator component 306 can generate the process definition 310 in order to specify a process built in conjunction with the sub-system definition 308.

The generator component 306 can utilize the sub-system definition 308 to represent the state of the server, while the process definition 310 can be utilized to represent the RFID processes developed and used by the runtime. For example, the RAML schema 312 containing the process definition 310 can be identified with "ProcessDefinition," with a target namespace location and associated reference "ProcessDefinition.xsd." Moreover, XML version and associated encoding is defined. The above is depicted below:

```
<?xml version="1.0" encoding="utf-8"?>
<xs:schema id="Process" elementFormDefault="qualified"
  xmlns:xs="http://www.w3.org/2001/XMLSchema"
  targetNamespace="http://tempuri.org/ProcessDefinition.xsd"
  xmlns="http://tempuri.org/ProcessDefinition.xsd">
```

As can be depicted in code, "deviceCollectionList" contains the element "deviceCollection." A device collection is a collection of RFID readers within a particular sub-system setting (e.g., RFID network,). For example, a Warehouse can be considered a particular sub-system (e.g., RFID network), wherein a device collection can be the collection of readers at the receiving dock door. Furthermore, "deviceCollection"

maps the underlying entities by associated names of physical readers via the binding process at deployment time. Following the above example, a reference to a single reader within "deviceCollection" can be referenced can be, but limited to, reader1_receiving_dock_door, readerA_dockdoor_receiving, receivingREADER1, . . . "deviceCollection" contains the fields: name (e.g., name of the collection) and configuration (e.g., property profile for the group).

The Process definition 310 defines an element "process" of the type "Process" such that it contains a sequence of fields such as, but not limited to name, (e.g., name of the RFID process), tracker (e.g., tracker used to track the Process execution), logicalSource (e.g., top level logical source of the process), writeHandler (e.g., component that deals with writing to Rfid Devices). "Process" is the top-level process class representing an RFID process. It is to be appreciated "Process" is the basic deployable unit in an RFID server. The above can be illustrated by the code that follows:

```
<xs:complexType name="Process">
  <xs:sequence>
    <xs:element minOccurs="0" maxOccurs="1" name="name" type="xs:string" />
    <xs:element minOccurs="0" maxOccurs="1" name="tracker" type="Tracker" />
    <xs:element minOccurs="0" maxOccurs="1" name="logicalSource" type="LogicalSource" />
    <xs:element minOccurs="0" maxOccurs="1" name="writeHandler" type="WriteHandler" />
  </xs:sequence>
```

The above demonstrates the initial instantiation of a complex type named "Process," wherein the elements "Tracker," "LogicalSource," and "WriteHandler" are members. Additionally, the code defines the element name and the type that has an associated ".xsd" string associated thereto. Once the members are defined as elements of "Process," the members (e.g., "Tracker," "LogicalSource," and "WriteHandler" . . . ) can further be defined. The process definition 310 can define "Tracker" with the following code allowing the tracking and creation of logs relating to runtime execution trails:

```
<xs:complexType name="Tracker">
  <xs:sequence>
    <xs:element minOccurs="0" maxOccurs="1" name="level" type="xs:string" />
    <xs:element minOccurs="0" maxOccurs="1" name="option" type="xs:string" />
  </xs:sequence>
</xs:complexType>
```

As illustrated above, the element "Tracker" is a tracker definition, wherein the fields level (e.g., level of tracking) and option (e.g., collection of options for tracking) are defined.

The process definition 310 defines an element "ArrayOfParameterData" containing "ParameterData," wherein "ParameterData" contains a name (e.g., parameter name) and value (e.g., an XML serializable object). The "ArrayOfParameterData" is a collection of parameters of a process component wherein a parameter is a parameter for an RFID component. For example, "ParameterData" represents a parameter for RFID components as [name, value] pair. The "ParameterData" has a defined name (e.g., the parameter name) and a value (e.g., an XML serializable object). The above is implemented with the following code example:

```
<xs:complexType name="ArrayOfParameterData">
  <xs:sequence>
    <xs:element minOccurs="0" maxOccurs="unbounded" name="parameter" type="ParameterData" />
  </xs:sequence>
</xs:complexType>
<xs:complexType name="ParameterData">
  <xs:sequence>
    <xs:element minOccurs="0" maxOccurs="1" name="name" type="xs:string" />
    <xs:element minOccurs="0" maxOccurs="1" name="data" />
  </xs:sequence>
</xs:complexType>
```

The process definition 310 provides a recursive definition of a readsource with the complex type name "LogicalSource," wherein "LogicalSource" reads from all the readSource and readers providing a combination. It is to be appreciated a "LogicalSource" is a top-level logical source of the process, wherein the process consists of logical sources arranged as a Tree. In other words, "LogicalSource" is a node in the logical sources tree representing a process. The "LogicalSource" is the root of the tree, and the output is sent to a Data sink of the process.

The "LogicalSource" is an active entity in the process, wrapping other components and linking them logically. A "LogicalSource" contains a set of components such as device collection (e.g., consisting of devices such as readers), optional event policies containing rules for filters and alerts, optional event-handlers and additional logical sources. Furthermore, it contains a set of sources for locating tag read events into logical source. Additionally, it has a single output point defined as the output of the last component. The code following depicts the above aspects:

```
<xs:complexType name="LogicalSource">
  <xs:sequence>
    <xs:element minOccurs="0" maxOccurs="1" name="logicalSourceList" type="ArrayOfLogicalSource" />
    <xs:element minOccurs="0" maxOccurs="1" name="deviceCollectionList" type="ArrayOfReaderCollection" />
    <xs:element minOccurs="0" maxOccurs="1" name="componentList" type="ArrayOfChoice1" />
  </xs:sequence>
</xs:complexType>
```

The code above defines a "LogicalSource" with members "logicalSourceList" (e.g., a list of logical sources which act as its input), "deviceCollectionList," (e.g., list of reader collections which act as its input) and a "ComponentList," (e.g., list of components) each of which is defined further in later code sections as seen infra.

The process definition 310 defines a collection of reader collections, such that "deviceCollectionList" is an array of "deviceCollections". A "deviceReaderCollection" in turn is an array of string. It should be appreciated that each string is a device or reader name. The following code illustrates this:

```
<xs:complexType name="ArrayOfDeviceCollection">
  <xs:sequence>
    <xs:element minOccurs="0" maxOccurs="unbounded"
```

```
name="devicereaderCollection" nillable="true"
type="deviceCollection" />
    </xs:sequence>
</xs:complexType>
<xs:complexType name="deviceCollection">
    <xs:sequence>
        <xs:element minOccurs="0" maxOccurs="1" name="readers"
type="ArrayOfString" />
    </xs:sequence>
</xs:complexType>
<xs:complexType name="ArrayOfString">
    <xs:sequence>
        <xs:element minOccurs="0" maxOccurs="unbounded" name="id"
nillable="true" type="xs:string" />
    </xs:sequence>
</xs:complexType>
"ArrayOfDeviceCollection" is utilized by "LogicalSource."
```

Continuing with the process definition 310 that facilitates generating the RAML schema 312 to provide a portable format for an RFID process, a "ComponentList" is defined. The "ComponentList" is a collection of components which can be event policies for filters or alerts, or event handlers. Moreover, filter and alert policies can be implemented on a logical source. For example, an alert for a logical source can be event condition action (ECA) style rules for Tag Read Events. In another example, a filter for a logical source drops or allows Tag Read Event streams. The code that follows is an example of "ComponentList"

```
<xs:complexType name="ArrayOfChoice1">
    <xs:choice minOccurs="0" maxOccurs="unbounded">
        <xs:element minOccurs="1" maxOccurs="1" name="eventHandler"
nillable="true" type="EventHandler" />
        <xs:element minOccurs="0" maxOccurs="unbounded"
name="eventPolicy" nillable="true" type="EventPolicy" />
    </xs:choice>
<xs:complexType name="EventHandler">
    <xs:sequence>
        <xs:element minOccurs="0" maxOccurs="1" name="assembly"
type="xs:string" />
        <xs:element minOccurs="0" maxOccurs="1" name="className"
type="xs:string" />
        <xs:element minOccurs="0" maxOccurs="1" name="parameterList"
type="ArrayOfParameterData" />
    </xs:sequence>
</xs:complexType>
```

The process definition 310 further defines "EventHandler" which is an event handler for a logical source. In other words, "EventHandler" is utilized to handle events emanating from a logical source. "EventHandler" contains the following fields: assembly (e.g., NET assembly of the event handler), className (e.g., class name of event handler), and parameterList (e.g., list of parameters of event handler). The above can be illustrated by the following code:

```
<xs:complexType name="EventHandler">
<xs:sequence>
    <xs:element minOccurs="0" maxOccurs="1" name="assembly"
type="xs:string" />
    <xs:element minOccurs="0" maxOccurs="1" name="className"
type="xs:string" />
    <xs:element minOccurs="0" maxOccurs="1" name="parameterList"
type="ArrayOfParameterData" />
    </xs:sequence>
</xs:complexType
```

The process definition 310 further defines a "WriteHandler" which deals with sending commands to devices (typically this involves writing to tags). It is to be appreciated that a "WriteHandler" deals with devices at a logical level, called as "LogicalWriter"s. Since it deals with one or more of these "LogicalWriter"s we have "ArrayOfLogicalWriter". This is illustrated by the following code:

```
<xs:complexType name="WriteHandler">
    <xs:sequence>
        <xs:element minOccurs="0" maxOccurs="1" name="assembly"
type="xs:string" />
        <xs:element minOccurs="0" maxOccurs="1" name="className"
type="xs:string" />
        <xs:element minOccurs="0" maxOccurs="1" name="parameterList"
type="ArrayOfParameterData" />
        <xs:element minOccurs="0" maxOccurs="1" name="writerList"
type="ArrayOfLogicalWriter" />
    </xs:sequence>
</xs:complexType>
<xs:complexType name="ArrayOfLogicalWriter">
    <xs:sequence>
        <xs:element minOccurs="0" maxOccurs="unbounded" name="writer"
nillable="true" type="LogicalWriter" />
    </xs:sequence>
</xs:complexType>
<xs:complexType name="LogicalWriter">
    <xs:sequence>
        <xs:element minOccurs="0" maxOccurs="1" name="name"
type="xs:string" />
        <xs:element minOccurs="0" maxOccurs="1" name="physicalWriter"
type="xs:string" />
    </xs:sequence>
</xs:complexType>
```

By generating the sub-system definition 308 and the process definition 310, the generator component 306 creates and employs the reader application markup language (RAML) schema 312. The RAML schema 312 can be utilized in order to mitigate errors while executing an RFID process within an RFID architecture. The RAML schema 312 represents the state of the server (e.g., RFID network, sub-system,) and the processes developed and utilized by a runtime to execute the RFID processes. Moreover, the RAML schema 312 is a portable format for the processes that facilitates setup and/or deployment of at least one RFID process. It is to be appreciated the RAML schema 312 contains a sub-system definition 308 and/or a process definition 310.

Figure 4:
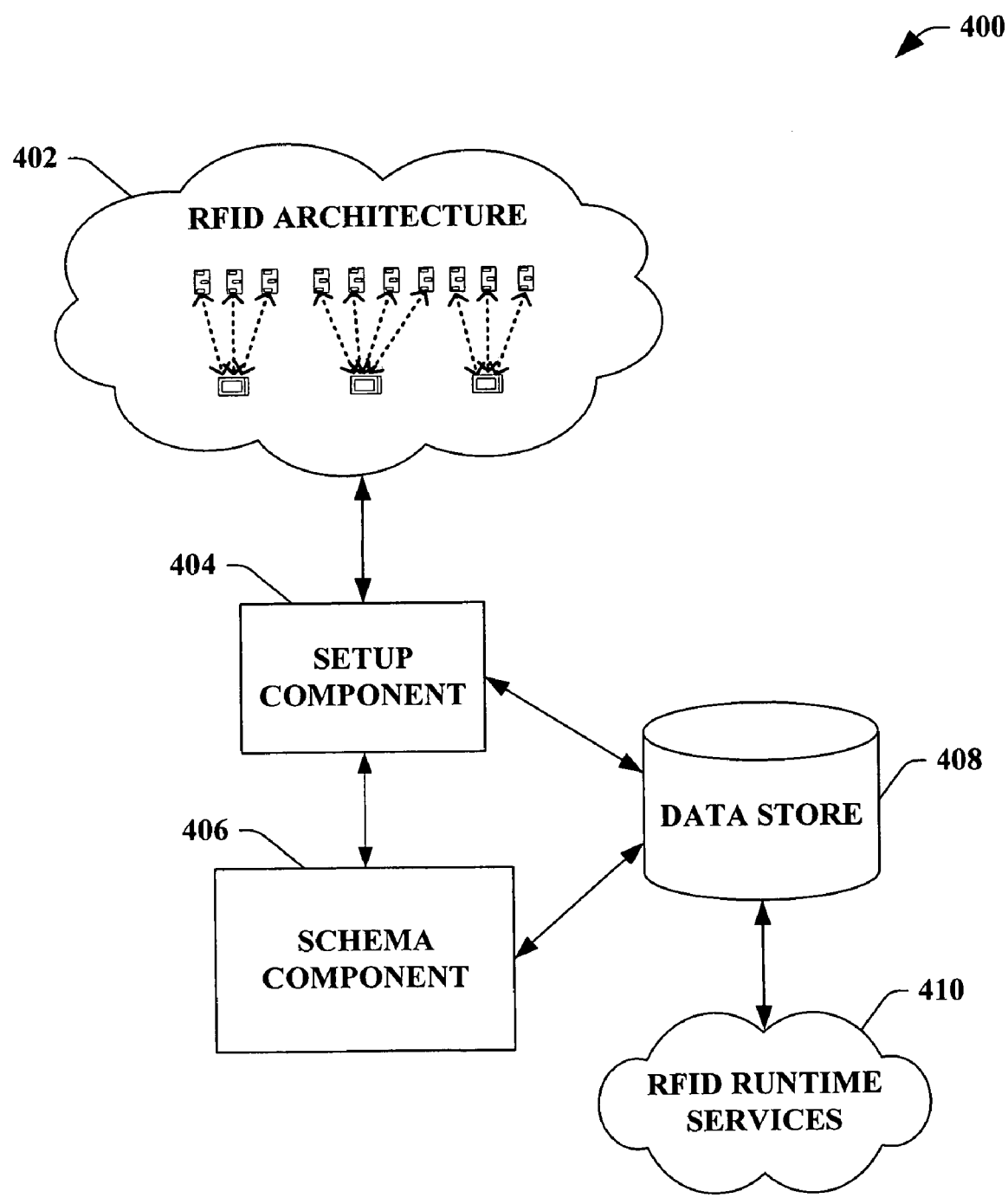
FIG. 4 illustrates a block diagram of an exemplary system that facilitates executing an RFID process by creating and/or employing a schema.

FIG. 4 illustrates a system 400 that facilitates implementing an RFID process by employing a reader application markup language (RAML) schema that provides a portable format for the RFID process. An RFID architecture 402 can include at least one RFID reader and at least one RFID tag. The RFID architecture 402 is a physical system wherein RFID readers receive RFID tag signals in order to identify an item and/or object which contains the RFID tag. For example, a manufacturing plant can contain an RFID architecture consisting of a plurality of readers at receiving dock door(s), shipping dock door(s), and utilizing a manufacturing process there between. The RFID readers can receive signals from the RFID tags, wherein the RFID tags provide unique identification of such a tagged item.

The system 400 further includes a setup component 404 that communicates with the RFID architecture 402 determining the entities within such environment allowing a schema component 406 to employ a reader application markup language (RAML) schema that provides a portable format to setup and deploy an RFID process. The setup component 404 provides, for example, the discovery of readers and associated data, configuration of readers, saving the RFID process specific reader settings, reader associated data, etc. By analyzing the RFID architecture 402 (e.g., determining the RFID readers within a server, and configuring such readers), the schema component 406 can create and employ a RAML schema containing a sub-system definition and/or a process definition that facilitates executing an RFID process based upon the analyzed RFID data.

For example, the setup component 404 can discover RFID readers before being utilized as a part of an RFID process definition. By discovering RFID readers within a server, the RAML schema can be utilized to represent the state of the server. Moreover, after the state of the server is represented, the RAML schema can be further utilized to represent the processes being developed and utilized by the runtime. For instance, RFID readers can be discovered by the following sample of code:

```
Device[ ] myReaderIds=serverStore.GetMultiple-
    Devices(GetDeviceOptions.ALL);
```

Once the readers are discovered, the setup component 404 can configure and save the discovered RFID readers based at least upon the specific RFID reader settings. The setup component 404 can store the discovered RFID readers and associated configurations in, for example, a data store 408. It is to be appreciated the RFID readers are configured are ePC compliant readers and are associated to the substantially similar reader collection. For instance, the proceeding code can be implemented in order to configure and store the discovered RFID readers:

```
Device writer=myReaderIds[0];

serverStore.SaveDevice(writer);
```

The above sample code creates and adds a list of physical readers in a server network (e.g., universe, sub-system). Once the list is generated, the physical RFID readers are configured. In the above example the implicit property profile for the 'writer' device is applied and stored to the data store 408 (e.g., the sample code above references the data store as the serverStore).

The setup component 404 can further create a logical reader collection. It is to be appreciated the properties invoked on the RFID readers are based at least upon the RAML schema employed by the schema component 406. Once created, the setup component 404 can add the physical RFID reader to the logical reader collection and specify properties associated thereto.

```
ReaderCollection epcReaderAndWriter = new
    ReaderCollection("WRITERS");
LogicalSource source = new LogicalSource( );
// associate a reader collection with the source
source.readerCollectionList = new ReaderCollectionList( );
source.readerCollectionList.Add(epcReaderAndWriter);
```

Furthermore, the setup component 404 configures the physical RFID readers in the logical reader collection with other configuration information (e.g., smoothing, data acquisition parameters, etc.). It is to be appreciated the property names and values utilized in configuration depend on the specific reader type (e.g., the properties that follow are reader dependent). The setup component 404 stores the logical reader collection and associated properties in the data store 408. The above can be implemented by the following sample of code:

```
PropertyProfile writerPropertyList = new PropertyProfile( );
// event mode false - property
Property eventModeProperty = new Property("EVENT MODE", "false");
writerPropertyList.Add(eventModeProperty);
// synchronous timeout - property
Property timeoutProperty = new Property("SYNCHRONOUS
    TIMEOUT", "1000");
writerPropertyList.Add(timeoutProperty);
writer.settings.properties = writerPropertyList;
// store the configured physical readers to the store.
Store serverStore = new Store( );
serverStore.SaveDevice(writer);
```

The schema component 406 can receive the discovered readers and configuration settings via the setup component 404 and/or the data store 408. The schema component 406 can employ a reader application markup language (RAML) schema, wherein RFID process are in a portable format facilitating employment and setup for a RFID runtime service(s) 410. The RAML schema consists of a sub-system definition (e.g., RFID network definition) and/or a process definition. The sub-system definition contains the definition for all the entities in the server, which are independent of a process. In other words, the sub-system definition (e.g., RFID network definition, universe) defines the server state and the entities on which processes are built. In addition, the process definition is the definition of an RFID process. The process definition contains the process related entities and inter-relationships. The RAML schema is utilized to represent the state of the server and the processes developed and used by the RFID runtime services 410.

The RAML schema can further be utilized in order to facilitate executing at least an RFID process. It is to be appreciated that a plurality of processes can be referenced as RFID runtime services 410. For example, a "Shipping Process" is a process that can be represented by the RAML schema. The "Shipping Process" represents multiple readers at various dock doors working together to perform tag reads, filtering tag reads, enriching tag reads, evaluating alerts, and storing relevant data to a sink for a host application. A dock door can contain a plurality of tag readers wherein multiple reads of a source tag can be provided. Such multiple reads can be read and filtered wherein, for instance, multiple reads of the same ID are filtered out (e.g., dropped). Moreover, alerts can be associated to such tag reads such as, for example, alerting the arrival or departure of a source tag. The determinations from the setup component 404 can be utilized by the schema component 406 in order to generate a RAML schema allowing a portable format for the RFID processes in the RFID architecture 402.

In yet another example, a "Manufacturing Process" where readers are configured to read as well a write based at least upon a location can be represented by the RAML schema. It is to be appreciated the "Manufacturing Process" can perform functions similar to those of a "Shipping Process" such as, but not limited to, filtering, enrichment, alerting, storing, etc. at the respective locations, wherein the schema created by the schema component 406 provides a portable format for the RFID processes to be implemented in the RFID architecture 402.

Figure 5:
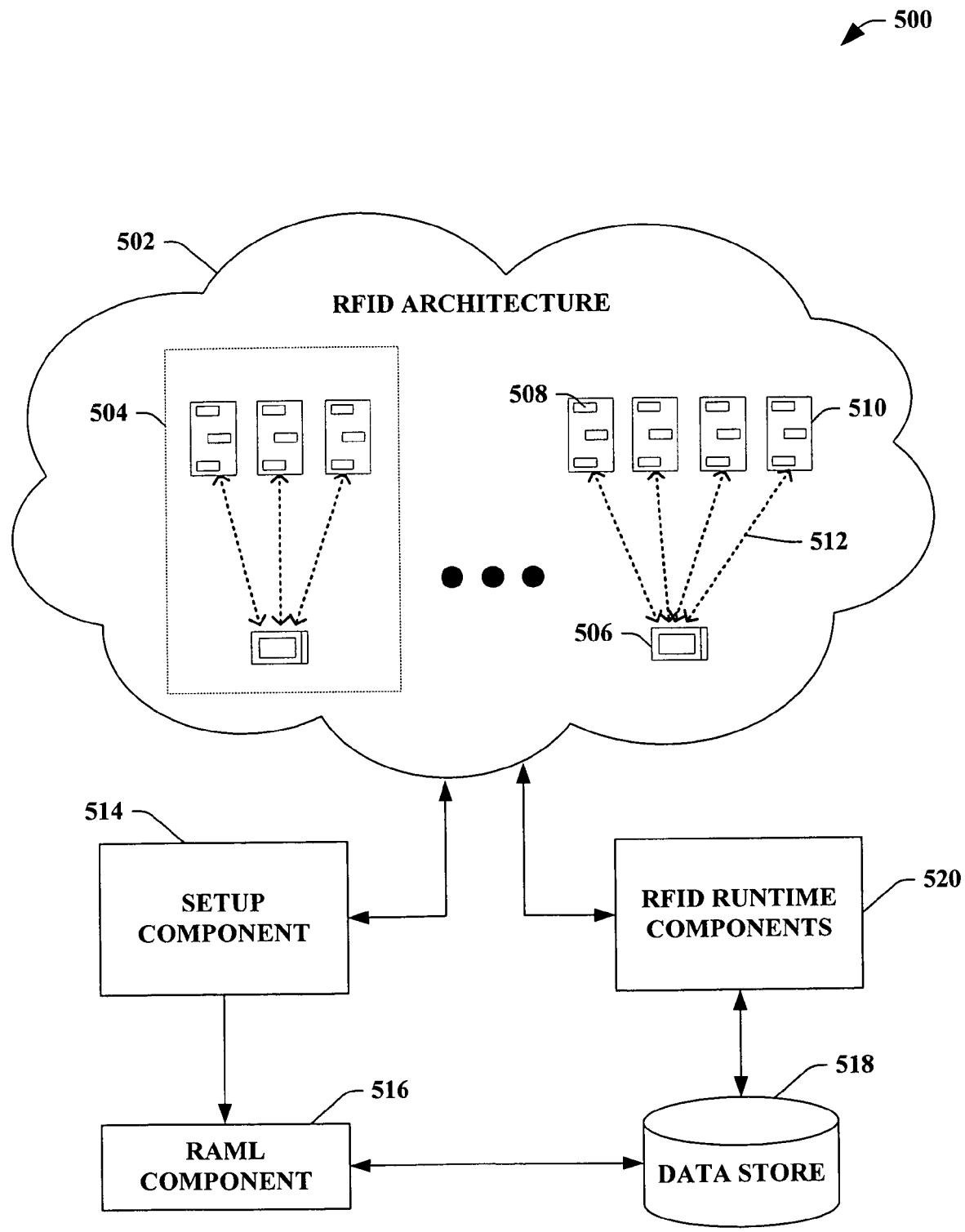
FIG. 5 illustrates a block diagram of an exemplary system that facilitates executing an RFID process by creating and/or employing a schema.

FIG. 5 illustrates a system 500 that facilitates executing an RFID process by employing a reader application markup language (RAML) schema that provides a portable format for the RFID process to be implemented within an RFID architecture 502. The RFID architecture 502 can include a plurality of servers (e.g., sub-systems, RFID networks), wherein a server is a set of discovered and/or configured readers in a server. For simplicity, the RFID architecture 502 illustrates a single universe containing two collections of readers, where a first collection 504 is shown. For instance, an RFID sub-system can be a location wherein the entities involved are related to a substantially similar process. In one example, a sub-system can be a Warehouse containing a plurality of receiving and/or shipping dock doors with associated RFID readers. Thus, first location 504 can be a collection of readers within the specified sub-system. It is to be appreciated a plurality of collection of readers can be implemented. Within a collection of RFID readers, an RFID reader 506 can receive an RFID signal 512 from a pallet of goods 510 containing at least one RFID tag 508. It is to be appreciated the pallets and/or goods can be tagged based at least upon user specifications (e.g., single pallets tagged, individual goods tagged, pallets and goods tagged, etc.).

The system 500 further includes a setup component 514 that analyzes the RFID architecture 512 in order to discover RFID readers within the server. Once discovered, the setup component 514 further configures the discovered RFID readers and saves the configured RFID readers to a memory (not shown). It is to be appreciated the setup component 514 provides the discovery of readers and associated data, configuration of readers, saving the RFID process specific reader settings, reader associated data, etc. By determining the RFID readers within a server, and configuring such readers, the RAML component 516 can create and employ a RAML schema containing a universe definition and/or a process definition that facilitates executing an RFID process. Upon analyzing the RFID architecture 502, the RAML component 516 creates a RAML schema based at least in part upon the analysis of the RFID architecture 502. The RAML schema created by the RAML component 516 facilitates representing the state of the server (e.g., RFID subsystem, RFID network) and the processes developed and utilized by the runtime. The RAML schema can be stored in a data store 518 providing a portable and accessible format for the RFID processes. It is to be appreciated the data store 518 stores the RAML schema until RFID runtime components 520 utilize such schema in order to implement an RFID process. The RFID runtime components 520 utilize the RAML schema as a portable format such that RFID processes are easily deployed and setup within the RFID architecture 502.

Figure 6:
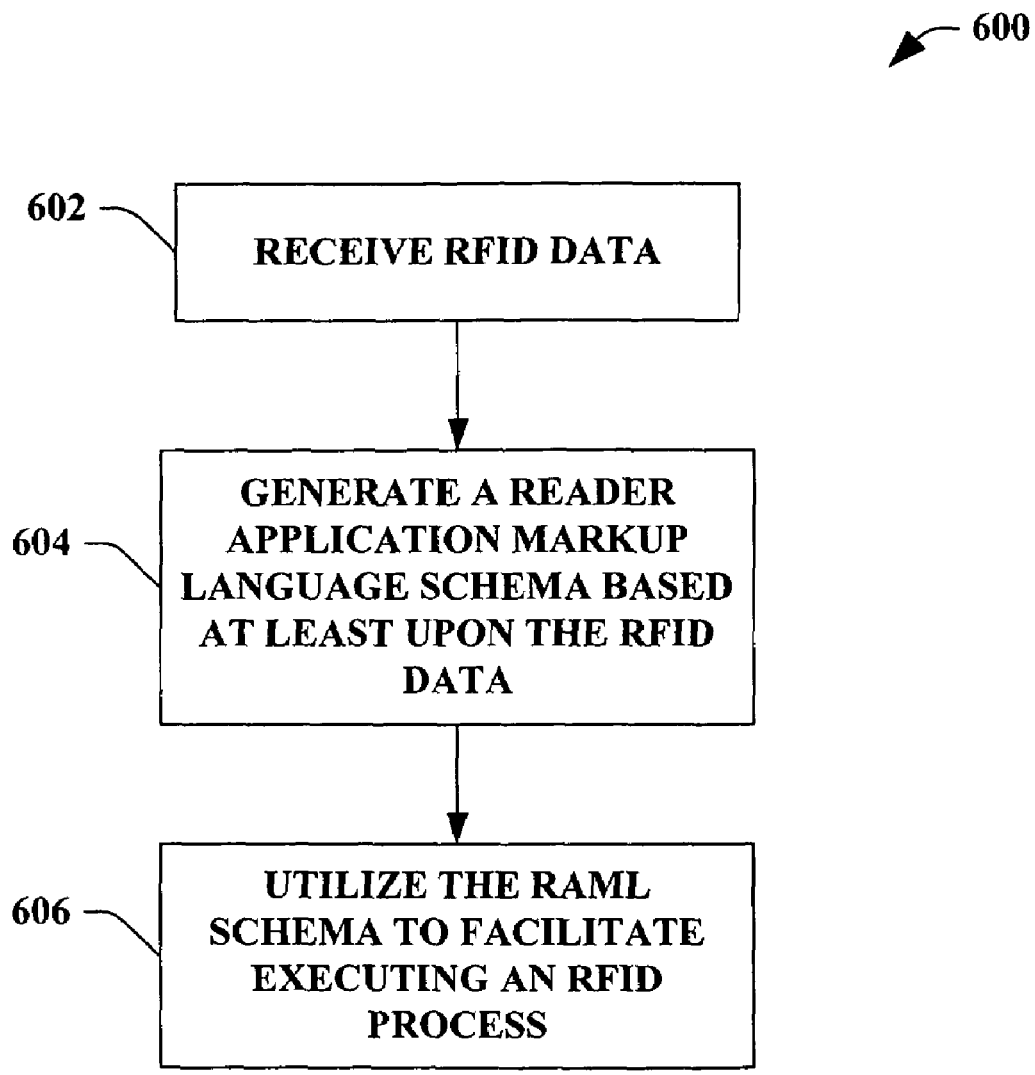
FIG. 6 illustrates a flow chart of an exemplary methodology that facilitates executing an RFID process within an RFID architecture by employing a reader application markup language (RAML) schema.
Figure 7:
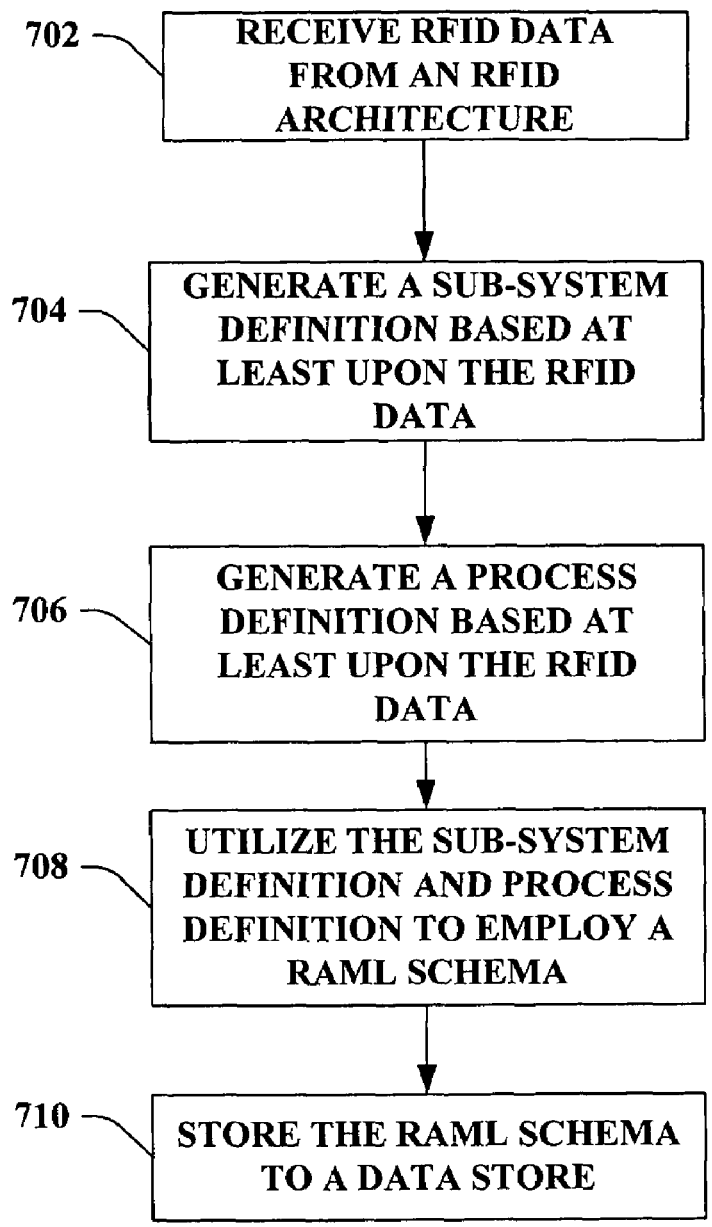
FIG. 7 illustrates a flow chart of an exemplary methodology that facilitates executing an RFID process within an RFID architecture by employing a reader application markup language (RAML) schema.
Figure 8:
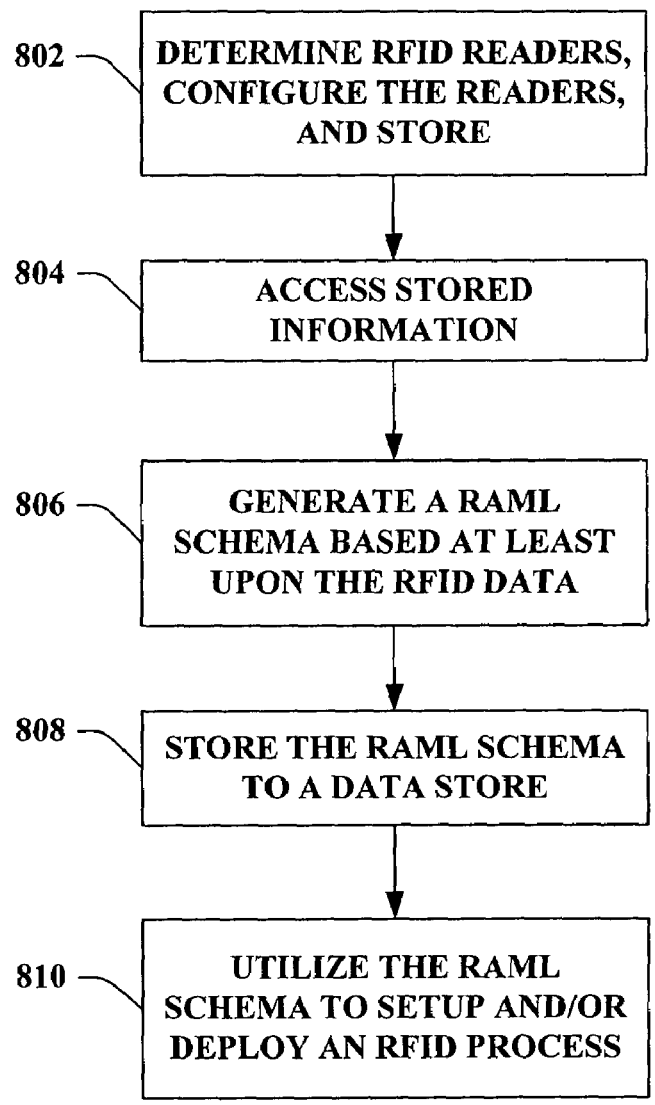
FIG. 8 illustrates a flow chart of an exemplary methodology that facilitates executing an RFID process within an RFID architecture by employing a reader application markup language (RAML) schema.

FIGS. 6–8 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 6 illustrates a methodology 600 that facilitates executing an RFID process within an RFID architecture by employing a reader application markup language (RAML) schema that provides a portable format. For example, the RFID architecture can be a system containing at least an RFID reader and associated RFID tag(s). At 602, RFID data related to an RFID architecture can be received. The RFID data can be, but not limited to, RFID readers within a server, configuration settings associated thereto, and/or RFID architecture related data. At 604, a reader application markup language (RAML) schema can be generated based at least upon the received RFID data. The RAML schema is created including a sub-set definition (e.g., containing the definition for the server state and the entities in the server) and a process definition (e.g., containing process related entities and inter-relationships) in order to provide a portable format in which the RFID process can be utilized to be setup and deployed. Next at 606, the RAML schema is utilized to facilitate executing an RFID process. The RAML schema can be employed to setup and deploy an RFID process in an RFID architecture. It is to be appreciated the RAML schema, upon generation, can be stored for later use or utilized dynamically. However, the RAML schema contains the universe definition and a process definition, which can facilitate executing an RFID process based at least in part upon the portable format.

Turning now to FIG. 7, a methodology 700 is illustrated that facilitates executing an RFID process within an RFID architecture by utilizing a reader application markup language (RAML) schema that provides a portable format. At 702, RFID data from an RFID architecture can be received. It is to be appreciated such RFID data can be, but not limited to, discovered readers and/or associated data, configuration of readers, saved RFID process specific reader settings, reader associated data, etc. It is to be appreciated the RFID data can be received from, but not limited to, an Internet connection, LAN, and/or RFID reader and host protocol.

Next at 704, a sub-system definition is generated based at least upon the received RFID data from the RFID architecture. The sub-system definition contains the definition for entities in the server, which are independent of any process. The sub-system definition defines the server state and the entities on which processes are built. For instance, the sub-system definition can contain "deviceConfiguration" with members: name, ReaderCollectionList, readerList, and processList. It is to be appreciated each member within "deviceConfiguration" can further be defined in order to provide the sub-system definition with the appropriate structure. Thus, sub-system (e.g., RFID network, set of discovered and/or configured readers in a server) associated data (e.g., reader collections, configuration, name, . . . ), RFID reader data (e.g., transport, configuration, name, reference, reader type, reader settings), properties (e.g., properties to be applied to the RFID reader, name of the property, list of the properties), and processes (e.g., contains data to utilize a business logic, list of processes, reference to processes) can further be defined and associated to elements.

At 706, a process definition is generated based at least upon the RFID data from the RFID architecture. The process definition contains all the process related entities and inter-relationships. The process definition specifies a process built on top of the sub-system. For example, the process definition can contain "Process" with members: name, tracker, security, logicalSource, and dataSinkList. It is to be appreciated each member within "Process" can further be defined in order to provide the process definition with the appropriate structure. Thus, for instance, logicalSource can be further populated and/or defined with, for example, logical source list, reader collection list, filter list (and associated filters), alert list (and associated alerts), and event handler.

Once the sub-system definition and the process definition are generated, the reader application markup language (RAML) schema can be employed in order to facilitate executing an RFID process in an RFID architecture by providing a portable format at 708. It is to be appreciated the RAML schema can include the sub-system definition and/or the process definition. Once the RAML schema is configured/generated containing the sub-system definition and/or the process definition, it can be stored in a data store in order to provide a portable format for the setup and deployment of an RFID process and/or service within an RFID architecture at 710. The RAML schema can be stored in a memory wherein the memory is accessible to a system that utilizes RFID processes and/or services.

FIG. 8 illustrates a methodology 800 that facilitates executing an RFID process within an RFID architecture by employing a reader application markup language (RAML) schema that provides a portable format. At 802, RFID readers discovered, configured and stored. The RFID readers can be related to an RFID architecture including at least one RFID reader that reads RFID tags. The discovered and configured RFID readers can be stored in, for example, memory. This information can be referred to as RFID data. Moreover, it is to be appreciated the memory can be either volatile or nonvolatile memory and can include both volatile and nonvolatile memory. Next at 804, the stored information (e.g., RFID data) can be accessed allowing a reader application markup language (RAML) schema to be generated, at 806, based at least upon the stored RFID data. The RAML schema can include a sub-system definition and/or a process definition. Furthermore, the RAML schema can be stored in a data store (e.g., memory), providing a portable format in which an RFID process can be setup and deployed. Next at 810, the RAML schema can be utilized (e.g., transmitted, uploaded, accessed, executed, downloaded, etc.) to setup and/or deploy an RFID process.

Figure 9:
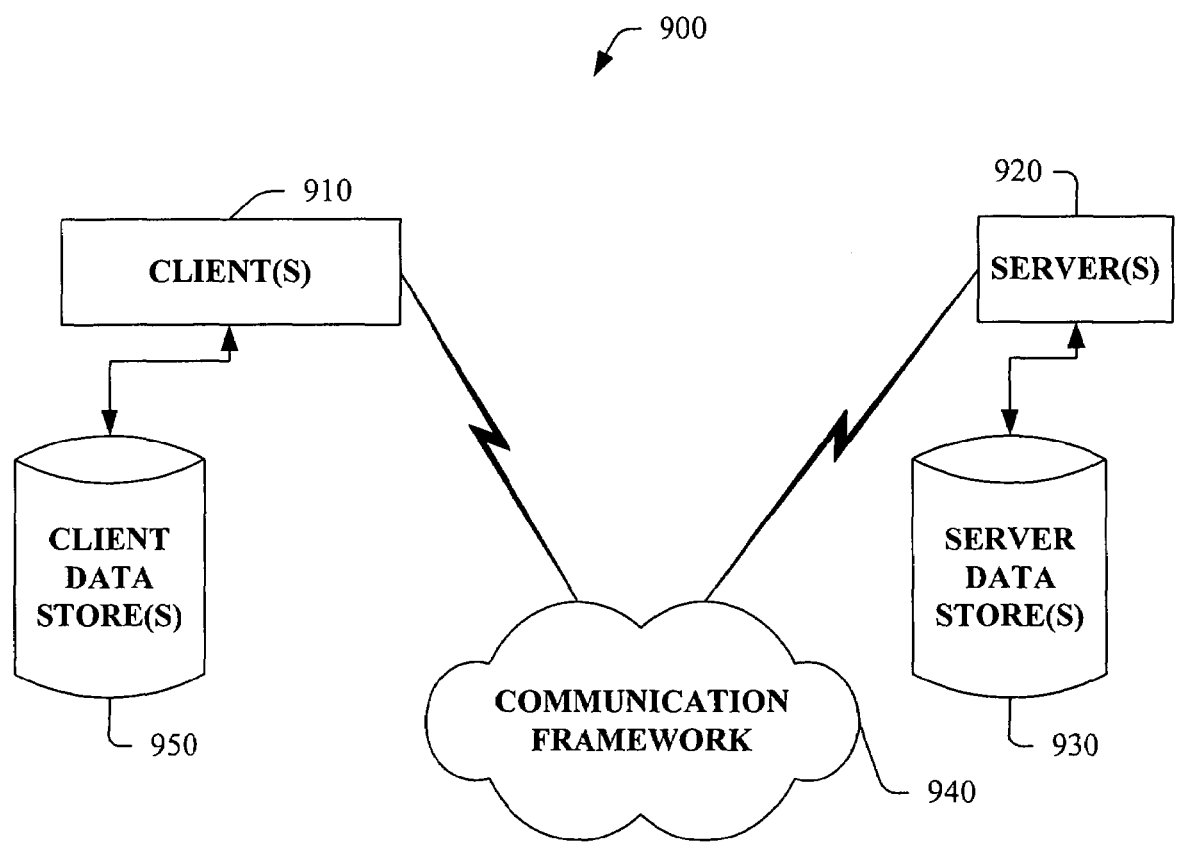
FIG. 9 illustrates an exemplary networking environment, wherein the novel aspects of the subject invention can be employed.
Figure 10:
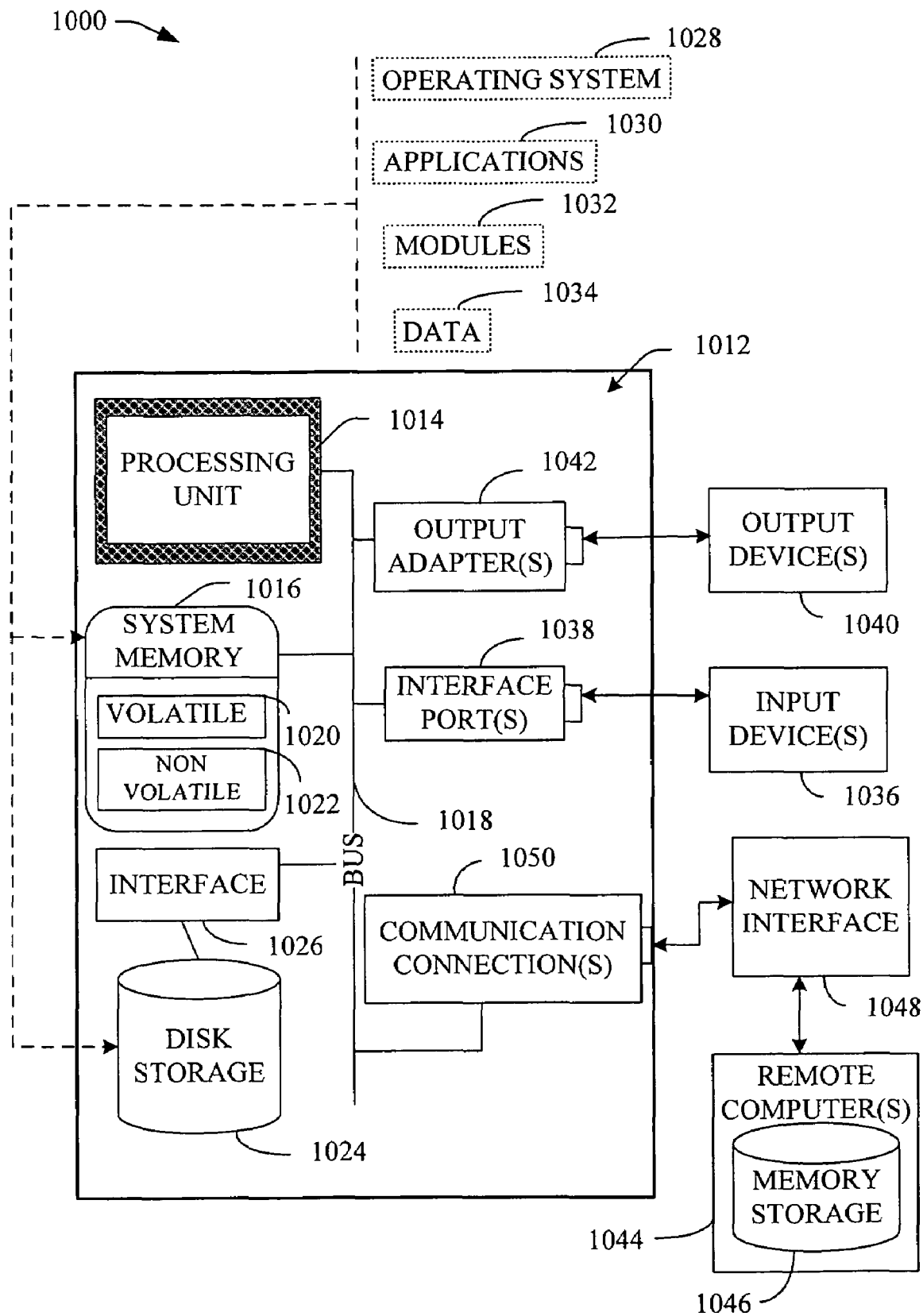
FIG. 10 illustrates an exemplary operating environment, wherein the novel aspects of the subject invention can be employed.

In order to provide additional context for implementing various aspects of the subject invention, FIGS. 9–10 and the following discussion is intended to provide a brief, general description of a suitable computing environment in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 9 is a schematic block diagram of a sample-computing environment 900 with which the subject invention can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject invention, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 940.

With reference to FIG. 10, an exemplary environment 1000 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. An RFID component that facilitates executing an RFID process, comprising:
a receiver component that receives RFID data related to an RFID architecture; and
a schema component that creates a reader application markup language (RAML) schema based at least upon the received RFID data and installs and/or deploys an RFID process, wherein the RAML schema defines physical components of the sub-system that are used to employ a particular RFID-based process and comprises a process definition that contains a Logical Source having at least one of a tracker and writehandler;
wherein the Logical Source has a second Logical Source, a reader collection, an event handler, and an event handler policy; and
wherein the RFID architecture comprises a collection of RFID readers that form a sub-system which comprises an RFID reader that receives an RFID signal and an RFID tag that transmits to at least one RFID reader.

2. The component of claim 1, wherein a subset of the collection of RFID readers are associated with a particular location within the sub-system.

3. The component of claim 1, wherein the RFID data is at least one of: an RFID reader; a discovered RFID reader; a configured RFID reader; an RFID antennae; and a collection of RFID readers.

4. The component of claim 1, wherein the receiver component receives the RFID data via at least one of: an Internet; a LAN; a WAN; a serial line; and a TCP/IP.

5. The component of claim 1 further comprises a setup component that analyzes the RFID architecture to determine a subset of the received RFID data to utilize in generating the RAML schema.

6. The component of claim 1, wherein the RAML schema comprises a sub-system definition that defines a state of a designated server and at least one entity in the sub-system that will be employed by the RFID process.

7. The component of claim 1, wherein the process definition defines the RFID process containing at least one RFID process related entity and an associated inter-relationship.

8. The component of claim 1, wherein the process definition specifies an RFID process built on top of the sub-system.

9. A computer-readable medium having stored thereon the RAML schema of claim 1.

10. A computer readable medium having stored thereon the components of claim 1.

11. A computer-implemented method that facilitates executing an RFID process, comprising:
   receiving RFID data from an RFID architecture;
   creating a reader application markup language (RAML) schema based at least upon the received RFID data; and
   utilizing the RAML schema to setup and/or deploy an RFID process;
   wherein the RAML schema defines one or more physical components of the sub-system that are used to employ a particular RFID-based process and comprises a process definition that contains a Logical Source having at least one of a tracker and writehandler;
   wherein the Logical Source has a second Logical Source, a reader collection, an event handler, and an event handler policy; and
   wherein the RFID architecture comprises a plurality of RFID readers that form a sub-system that comprises an RFID reader that receives an RFID signal and an RFID tag that transmits to at least one RFID reader.

12. The computer-implemented method of claim 11, further comprising:
   storing the RAML schema to a computer-readable medium;
   employing the RAML schema via the computer-readable medium.

13. A data packet that communicates between the receiver component and the schema component, the data packet facilitates the method of claim 11.

14. The computer-implemented method of claim 11, the RAML schema comprises a RFID network definition with the state of a server and associated entities.

15. The computer-implemented method of claim 11, the RAML schema contains a process definition with process related entities and inter-relationships.

16. The computer-implemented method of claim 11, further comprising analyzing the received RFID to determine a subset of RFID data.

17. A computer implemented system that facilitates executing an RFID process, comprising:
   means for receiving RFID data from an RFID architecture;
   means for creating a reader application markup language (RAML) schema based at least upon the received RFID data; and
   means for utilizing the RAML schema to setup and/or deploy an RFID process;
   wherein the RAML schema defines physical components of the sub-system that are used to employ a particular RFID-based process and comprises a process definition that contains a Logical Source having at least one of a tracker and writehandler;
   wherein the Logical Source has a second Logical Source, a reader collection, an event handler, and an event handler policy; and
   wherein the RFID architecture comprises a collection of RFID readers that form a sub-system which comprises an RFID reader that receives an RFID signal and an RFID tag that transmits to at least one RFID reader.

* * * * *